United States Patent [19]

Rhee et al.

[11] Patent Number: 4,546,004
[45] Date of Patent: Oct. 8, 1985

[54] METHOD OF PRODUCING LOW-GOSSYPOL COTTONSEED PROTEIN MATERIAL

[75] Inventors: Khee C. Rhee, College Station; E. W. Lusas, Bryan, both of Tex.

[73] Assignee: The Texas A&M University System, College Station, Tex.

[21] Appl. No.: 583,284

[22] Filed: Feb. 27, 1984

Related U.S. Application Data

[63] Continuation of Ser. No. 456,439, Jan. 7, 1983, abandoned, which is a continuation of Ser. No. 230,451, Feb. 2, 1981, abandoned.

[51] Int. Cl.⁴ ............................................. A23J 3/00
[52] U.S. Cl. .................................... 426/656; 426/629; 426/512; 260/123.5
[58] Field of Search ................... 426/656; 260/123.5

[56] References Cited

U.S. PATENT DOCUMENTS

| | | | |
|---|---|---|---|
| 2,414,299 | 1/1947 | Hall | 426/656 X |
| 2,581,342 | 1/1952 | Altschul et al. | 260/123.5 |
| 3,391,001 | 7/1968 | Sair | 426/656 X |
| 3,493,385 | 2/1970 | Hack | 426/656 X |
| 3,656,963 | 4/1972 | Roberson | 426/656 X |
| 3,929,890 | 12/1975 | Pfister | 426/656 X |

*Primary Examiner*—Robert Yoncoskie
*Attorney, Agent, or Firm*—Arnold, White & Durkee

[57] ABSTRACT

There is disclosed a method of producing a substantially gossypol-free protein food product by boiling a presscake or solvent extracted gossypol-containing cottonseed metal in the presence of a hydrochloric acid solution. A neutralized protein hydrolyzate can be obtained which is suitable as a food additive.

8 Claims, 3 Drawing Figures

Fig. 2

A. GOSSYPOL ACETATE (AOCS)
B. GOSSYPOL RECOVERED FROM COTTONSEED MEAL (AOCS)
C. 12 HOUR HYDROLYZED GLANDED COTTONSEED EXTRACT
B. 12 HOUR HYDROLYZED GLANDLESS EXTRACT

Fig. 1

COTTONSEED MEAL → HYDROLYSIS → NEUTRALIZATION → SCREENING → CENTRIFUGATION (DECANTING) → CENTRIFUGATION (BASKET) → FILTERING → SPRAY DRYING → HYDROLYZED COTTONSEED PROTEIN

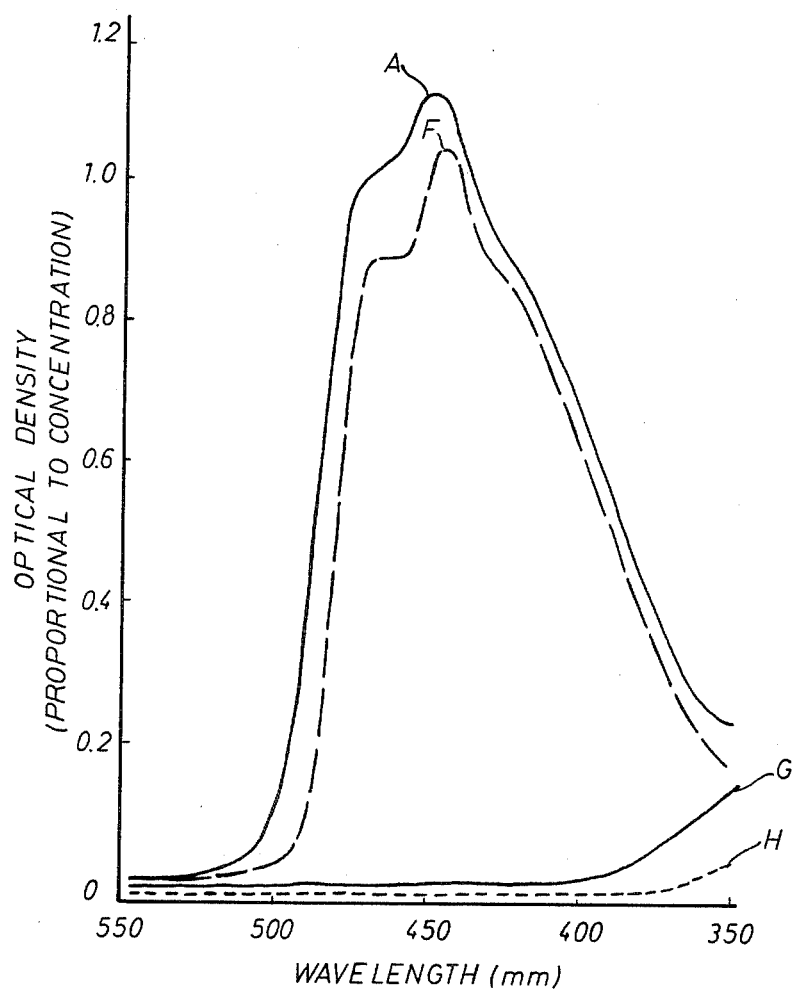

METHOD OF PRODUCING LOW-GOSSYPOL COTTONSEED PROTEIN MATERIAL

This is a continuation of application Ser. No. 456,439, filed Jan. 7, 1983, now abandoned, which is a continuation of Ser. No. 230,451, filed Feb. 2, 1981, now abandoned.

BACKGROUND OF THE INVENTION

It has long been recognized that cottonseeds are a valuable source of natural food oil and protein. However, while commercial processes have been developed for extracting oil from cottonseeds, the potential protein value of the seeds has not heretofore been able to be fully realized. This is primarily due to the presence in glanded cottonseed of gossypol, a complex polyphenolic compound which is quite toxic and, therefore, cannot be tolerated in the food of most animals (essentially not at all in human food). Gossypol has even been found to possess some characteristics which make it a natural contraceptive.

To effectively utilize the natural food protein values of glanded cottonseed, therefore, the gossypol present in the seed must first either be extracted destroyed or detoxified. Development of commercially practicable extraction procedures has been hindered due to the fact that gossypol and its derivatives are insoluble in water and most organic solvents. Thus, the gossypol remains in the proteinaceous press cake material from which the food oils have been extracted, usually with hexane. Procedures have been developed for the extraction of gossypol from glanded cottonseed meal, usually involving the use of acetone, but they are relatively time-consuming and expensive.

Attempts at detoxification of gossypol in cottonseed meal from glanded cottonseeds have involved heating the cottonseed meal to split the gossypol ring structure, causing the gossypol to bind with the amino acids present in the protein of the cottonseed meal. In order to destroy gossypol, the procedures thus far developed have required the use of high temperatures (in excess of 150° C.) and pressures, or treatment with ammonia gas. While successful, they have not been widely used commercially. This is because they tend to destroy some protein, thereby substantially decreasing food value of the material. More importantly, detoxification processes develop an "off-flavor" in the product, making it impossible to use the product as a human food or food supple- ment.

Accordingly, present efforts at utilizing the protein value of glanded cottonseed are limited to use of limited quantities of cottonseed meal as an additive to feeds of ruminants (who possess micro-organisms in their first stomach which apparantly detoxify a limited amount of gossypol). Research and development efforts aimed at realizing the protein potential in glanded cottonseed meal as a source of protein for human consumption have mainly been aimed at solvent extraction procedures for removing gossypol from the meal without affecting the protein value.

SUMMARY OF THE INVENTION

The present invention relates to a method and procedure for destroying the gossypol naturally present in glanded cottonseed. The process of the present invention enables realization of the protein value derivable from glanded cottonseed and use of the protein derivative as a food supplement/additive for non-ruminant animals, particularly humans. The products produced according to the present invention are not only substantially gossypol-free, but further have a very desirable "meat-like" flavor, which is very palatable to humans.

According to the method of the present invention, a substantially gossypol-free, water-soluble protein food product is produced from glanded cottonseeds by a process which comprises boiling the cottonseed meal produced after solvent extraction of natural oils in a solution of hydrochloric acid for at least one hour. A soluble protein hydrolyzate is produced which is substantially free of gossypol and which, when neutralized with sodium hydroxide to a pH level of about 5.0 and separated from insoluble solid residue, results in a very palatable soluble protein derivative food supplement. This soluble protein hydrolyzate may further be dried to produce a fine powder, and optionally compacted into cubes or other suitable shape to be used as an additive to liquid foods, such as soups, or the like. A very desirable meat flavor bouillon cube may be produced by mixing the dried, neutralized protein hydroyzate with other suitable ingredients prior to compacting. This soluble protein hydrolyzate may also be concentrated into a syrup-like product for use as a sauce after proper dilution.

More particularly, the method of the present invention by which a substantially gossypol-free, water-soluble protein food product is produced from glanded cottonseeds comprises combining a quantity of solvent extracted gossypol-containing cottonseed meal with at least about three times its volume of hydrochloric acid solution having a concentration of at least about 1.5 normal (N), preferably 3 normal, or higher, and thereafter boiling the cottonseed meal/acid combination, with reflux, for about one to sixteen hours, or until substantially all solubilized protein contained in the meal has been hydrolyzed. It has been found that during this process, the gossypol previously present in the cottonseed meal is essentially completely destroyed, i.e., the concentration reduced to a detectable level of less than about 450 ppm. Following the above acid hydrolysis procedure, the resultant protein hydrolyzate is neutralized with sufficient sodium hydroxide (NaOH) to bring the pH to within the range of about 5.0 to 6.0. Neutralization must be conducted relatively slowly, with thorough mixing, otherwise some gelatinous precipitate will be formed, which will interfere with the subsequent filtering operations. Also, neutralization must be substantially slow to minimize local alkali burning of product and to protect operators from excessive heat generated by the acid-alkali reaction.

DESCRIPTION OF THE DRAWINGS

FIG. 1 is a block flow diagram depicting the main unit operations of the invention process;

FIG. 2 and FIG. 3 are spectral optical density curves for the gossypol-aniline color complex produced according to the American Oil Chemists Society Official Methods for Detecting the Presence of Free Gossypol in Cottonseed Products.

DETAILED DESCRIPTION AND PREFERRED EMBODIMENTS

The process of the present invention will be more fully described with reference to FIG. 1, which sets forth a process flow diagram of the preferred embodiment of the process.

Preparation of the Cottonseed Material

Glanded cottonseed meal can be obtained directly from processors of cottonseeds. It is a byproduct of the processes by which cottonseed oil is obtained, typically produced as the press cake or meal remaining after the cottonseeds have been crushed and the oil extracted with organic solvents such as hexane. The cottonseed meal will typically be in the form of a dry granular or cake-like material. It may even be desirable, at times, to employ crushed glanded cottonseeds, still containing the natural oils, in the process of the present invention. Suitable oil extraction procedures will then have to be included.

It is preferred in the process of the invention to grind the cottonseed meal in order to break large aggregates and, thereafter, to screen the meal to remove linters and hulls. An acceptable screening would be through a 20–60 mesh ASTM screen. Increased recovery of protein is realized when the meal is first ground and the hull material separated.

Practical processing limits dictate the type of slurry formed by cottonseed meal and the hydrochloric acid solution. Corrosiveness of the hydrochloric acid places a significant limitation on the type and size of process instrumentation and apparatus. This, in turn, places a limitation on the nature of the meal/acid slurry which will be processible for a set of given process conditions. It appears that it is not physically practical to handle high solid slurries, and a meal-to-acid slurry ratio of about 1 kg of meal to about 3 to 5 liters of acid is recommended.

Acid Hydrolysis

At meal-to-acid slurry ratios of greater than about 1:3 and hydrochloric acid concentrations greater than about 6%, complete hydrolysis of solubilized protein contained in cottonseed meal is readily achieved in from about one to twelve hours of boiling, with reflux. The degree of hydrolysis can be determined by a combination of trichloroacetic acid (TCA) and Kjeldahl nitrogen analysis techniques. A 30% TCA solution is utilized to precipitate unhydrolyzed protein and large peptides from the hydrolyzate, employing equal volumes of TCA solution and hydrolyzate. After removing the precipitate by centrifugation, the proportion of nitrogen remaining in the supernatant can be determined by the Kjeldahl method.

Factors influencing hydrolysis time are acid concentration, ability to agitate the slurry (influenced in turn by the meal to acid ratio) and whether or not the meal is ground prior to preparation of the slurry. In general, hydrochloric acid of from about three to about six normal (6% to 18%) will be suitable to effect hydrolysis. The extent of protein hydrolyzed (measured in terms of original nitrogen recovered) will increase with acid concentration and length of hydrolysis. Nevertheless the upper limit achieved under most conditions will be in the lower to mid-60% range. For unground meal, it appears that the maximum yield of hydrolyzate is achieved in about fourteen hours and maximum recovery of nitrogen achieved in about fifteen hours hydrolysis time. When the meal is ground prior to preparation of the meal/acid slurry, the maximum yield of hydrolyzate and maximum recovery of nitrogen is achieved in about twelve hours.

Neutralization

As with the hydrochloric acid, only food grade sodium hydroxide should be used for neutralizing the hydrolyzate. It is recommended that a 50% solution be made by dissolving sodium hydroxide pellets or flakes in water prior to addition to the acid hydrolyzate. The solution should be allowed to settle until it becomes clear by precipitation of sodium carbonate salts, and thereafter the clear solution utilized for neutralization.

Neutralization of the acidic hydrolyzate must be conducted at a slow rate, and with thorough mixing, to prevent localized excessive concentrations of sodium hydroxide in the hydrolyzate. When such occurs, considerable heat of neutralization is generated and gelatinous materials are created which tend to foul the subsequent filtering operations and further processing. It has been found that addition of the 50% sodium hydroxide solution at a rate of about 2 liters per minute will be effective to prevent excessive buildup of heat and formation of gelatinous material in a hydrolyzate solution prepared with 48 liters of 3 N hydrochloric acid.

The neutralization should be continued until the pH of the solution reaches the range of from about 4.5 to about 5.5, with an end point of about 5.0 preferred.

Gossypol Analysis

For literally centuries, soy bean meal has been boiled in an acid medium to produce a palatable food additive. Acid hydrolysis is well-known as one acceptable technique for producing soy sauce. However, it appears that acid hydrolysis has not heretofore been considered as a means for producing an acceptable food product from cottonseed. One reason appears to have been that the standard analysis procedures for measuring gossypol levels in cottonseed meal are not suitable for analysis of acid hydrolysate, giving inaccurate readings. Accordingly, it was necessary during the development of the present invention to develop a modified gossypol assay procedure.

Pure gossypol acetate is insoluble in water. However, it appears that immediately upon acidification, a breakdown occurs, resulting in creation of compounds which are extracted with solvents and react with the color-amplifying aniline used in the standard colorimetric American Oil Chemists Society (AOCS) assay method. In the established AOCS free gossypol assay, gossypol is extracted from the meal by a mixture of acetone and water, reacted with aniline to amplify the color, and its concentration determined spectrophotometrically at a wavelength of 440 nanometers (nm). Darkness of the color of the extracted aniline-reacted gossypol is proportional to its concentration. Actual content is determined by comparing optical density of the test solution with a standard curve whose points have been established using known amounts of pure gossypol acetate.

In FIG. 2 of the accompanying drawings, the spectral optical density curve for the gossypol-aniline color complex developed from pure gossypol is shown in Curve A. A spectral curve of aniline-reacted gossypol extracted according to standard solvent extraction procedures from a sample of glanded cottonseed meal is shown as curve B, indicating that free gossypol recovered from gossypol-containing cottonseed meal is spectrally similar to pure gossypol acetate.

However, also shown in FIG. 2 are the spectral optical density curves of the aniline-complexes of two extracts obtained by the standard AOCS method from the solid residue of two acid hydrolysis procedures using the technique of the present invention. Curves C and D represent the complex extracted from the residue following 12 hours of boiling cottonseed protein with three normal hydrochloride acid at a 1:4 meal to acid ratio. The complex of curve C was obtained from typical glanded cottonseed, while that of curve D was produced from the residue of a hydrolyzate of 100% hand-picked kernels of glandless cottonseed (which would contain no natural gossypol). The similarity between the curves C and D illustrates that production of assay-interfering substances occurs even when gossypol is known to be absent. Disappearance of the critical 440 nm peak indicates destruction of the form of gossypol normally assayed by the AOCS method. The shape of the new peak at 480 nm appearing on curves C and D apparently results from newly created hydrolysis products and results in erroneously high readings when assaying for gossypol by standard colorimetric techniques recommended by AOCS.

It was further confirmed by thin-layer chromatography methods that gossypol-like compounds (at least, those which would produce an artificial positive reading for gossypol under the standard AOCS technique) were not present in glanded cottonseed meal hydrolyzate, but could have been detected if they were present.

Accordingly, a procedure for extracting gossypol from glanded cottonseed hydrolyzate was developed which would not be interfered with by compounds generated during the hydrolysis process. This procedure involves an initial extraction from the hydrolysis residue with petroleum ether. This extract is dried of solvent by heating over a steam bath, and thereafter analyzed by the recommended AOCS method. The curves in FIG. 3 depict the spectral characteristics of aniline-gossypol acetate complexes extracted following the modified procedure. It will be seen that the characteristics of pure gossypol (curve A) are not appreciably changed by the newly adapted extraction procedure (curve F illustrates the spectral curve of gossypol acetate extracted under the new procedure). Curves G and H illustrate the results obtained by a 12 hour hydrolysis of glanded cottonseed meal according to the invention (curve G) and a three hour analysis (curve H). These curves confirm the fact that gossypol would not be found at any time in cottonseed hydrolyzate which is free of residue solids.

electric heaters. Duration of hydrolysis was measured from the time the contents of the flask were actually boiling. Following the predetermined hydrolysis time, flask contents were cooled to room temperature, and the pH thereafter adjusted to 5.0 with 50% NaOH solution. Liquid hydrolyzate was separated from the solid residue by filtration through a Whatman No. 1 filter paper, and the volume and weight of each determined. Dry weights were measured after oven drying all products. The results are summarized in Table I. Nitrogen and free gossypol contents of these products were determined according to the discussed methods. Nitrogen recovery was also calculated for the hydrolyzates, on the basis of original meal nitrogen content estimated at 7.87 grams nitrogen per 100 grams meal. The data summarized in Table I represent the average of two replicate runs for each example.

TABLE I

| Acid Concentration (N) | Hydrolysis Time (hr) | Amount of 50% NaOH Used (ml) | Residue Dry Weight (g) | Residue Nitrogen Content (%) | Residue Free Gossypol Content (ppm) | Yield Liquid Volume (ml) | Yield Liquid Weight (g) | Hydrolyzate Dry Weight (g) | Hydrolyzate Nitrogen Content (%) | Hydrolyzate Nitrogen Recovery (%) | Free Gossypol Content (ppm) |
|---|---|---|---|---|---|---|---|---|---|---|---|
| Ex. 1-1.5 | 12 | 26.5 | 48.0 | 4.28 | 286 | 155.5 | 169.0 | 29.5 | 6.92 | 51.8 | 25 |
| Ex. 2-1.5 | 16 | 26.0 | 38.0 | 4.25 | 299 | 156.0 | 169.5 | 30.4 | 6.78 | 52.3 | 61 |
| Ex. 3-2.0 | 12 | 36.5 | 42.5 | 3.91 | 249 | 166.0 | 183.0 | 37.7 | 6.57 | 62.9 | 6 |
| Ex. 4-2.0 | 16 | 37.0 | 36.0 | 3.89 | 280 | 169.0 | 186.0 | 37.1 | 6.67 | 62.8 | 16 |
| Ex. 5-2.5 | 12 | 45.5 | 40.5 | 3.73 | 173 | 184.5 | 205.0 | 42.9 | 6.06 | 66.0 | 8 |
| Ex. 6-2.5 | 16 | 45.5 | 35.5 | 3.62 | 240 | 185. | 205.5 | 43.6 | 6.13 | 67.8 | 6 |
| Ex. 7-3.0 | 12 | 55.0 | 36.5 | 3.76 | 185 | 192.5 | 215.0 | 48.9 | 5.81 | 72.1 | 1 |
| Ex. 8-3.0 | 16 | 55.5 | 34.0 | 3.62 | 252 | 206.5 | 231.5 | 52.3 | 5.58 | 74.1 | 3 |

EXAMPLES

Fifty grams of unground, unseived glanded cottonseed meal were weighed directly into one liter round bottom flasks. Two hundred milliliters of freshly prepared hydrochloric acid solution was added and the contents brought up to boiling, under refluxing, using A simplified flow diagram of a pilot plant embodiment of the process of the invention is presented in FIG. 1. Six separate batches were prepared each using a total of 48 liters of 3 N HCl solution (density at 20° C. equals 1.0425) and 12 kg of unground glanded cottonseed meal. Each batch was raised to boiling (104° C.) temperature, maintained at that temperature for fourteen hours, and thereafter cooled to 42° C. The resulting hydrolyzate was neutralized to pH 5.0 with a 50% NaOH solution (density at 20° C. equals 1.525). Vigorous agitation was maintained throughout neutralization and the rate of sodium hydroxide addition was kept at approximately 2 liters per minute in order to avoid localized alkaline spots that could produce precipitation of gelatinous material. After about five minutes, 8,360 ml of sodium hydroxide solution raised the pH of the hydrolyzate to 5.0 and the temperature to 78° C.

The neutralized hydrolyzate was passed through a 165 mesh stainless steel vibratory screen in order to remove coarse residue particles. The liquid was then transferred to a decanting centrifuge and centrifuged at a rate of about 1.5 gallons per minute at approximately 3,000 g. Machine speed was 5900 rpm; backdrive speed was 5,000 rpm.

After decanting, the finer residues were further separated in a basket centrifuge at 1800 g, using a No. 2 nylon mesh basket liner. The total amount of residue separated in the combined centrifugation steps amounted to 5.5 kg. The remaining hydrolyzate after screening and centrifuging totalled 45.9 kg.

While the hydrolyzate remaining after screening and centrifuging was essentially a clear solution, it was determined that a finishing filtering step would be necessary to avoid possible clogging of the nozzle of the spray dryer. It was also considered desirable to remove even the slightest hazy appearance in the hydrolyzate so that when redissolved, the solution would be absolutely clear. Filtering was performed in a polishing filter press using cellulose filter pads. Thereafter, the filtered hydrolyzate, totalling 39.1 kg, was sprayed dry in a Swenson pilot plant spray dryer under the following conditions:

Air inlet temperature: 177° C.
Feeding pressure: 32 PSI
Atomizing pressure: 35 PSI
Rate: 8–7 kg of water/hour removed.

In all, 29.75 kg of water are removed from the final dry hydrolyzed cottonseed protein product weighed 9.35 kg. The overall process produced 0.78 kg of hydrolyzed cottonseed protein for every 1.0 kg of gossypol-containing cottonseed meal introduced to the process.

The dry cottonseed hydrolyzate powder produced according to the invention as outlined above produced a clear broth when dissolved in water and had a pleasant "meat-like" flavor. This flavor can be enhanced through the addition of such ingredients as beef fat, salts, spices, and the like, to produce a very palatable bouillon cube type product.

The foregoing description has been directed to particular embodiments of the invention in accordance with the requirements of the patent statutes for the purposes of illustration and explanation. It will be apparant, however, to those skilled in this art that many modifications and changes in the procedures set forth will be possible without departing from the scope and spirit of the invention. The following claims should be interpreted to embrace all such modifications and variations.

What is claimed is:

1. The method of producing a substantially gossypol-free soluble protein food product from gossypol-containing cottonseed meal which comprises:
   combining press cake or solvent-extracted cottonseed meal from gossypol-containing cottonseeds with at least about 3 times its volume of hydrochloric acid solution having a concentration approximately equal to or greater than one normal;
   boiling said meal/acid combination, with reflux, at temperatures below about 150° C., for approximately 1 to 16 hours, until substantially all the gossypol has been destroyed;
   thereafter, adding to the resultant acid protein hydrolyzate sufficient sodium hydroxide in a manner effective to neutalize the hydrolyzate to a pH of about 5.0 without forming gelatinous precipitate; and
   separating this neutralized protein hydrolyzate from the insoluble residue.

2. The method as in claim 1 further comprising the step of drying the neutralized protein hydrolyzate to produce a dry soluble hydrolyzed protein material.

3. The method of claim 1, further including the steps of drying the neutralized hydrolyzate and compacting the resultant dried material into a shape suitable for use as an additive to foods.

4. The method of claim 1 further comprising the step of drying the neutralized protein hydrolyzate to produce a dry soluble hydrolyzed protein material.

5. The method of claim 2 further comprising the step of drying the neutralized protein hydrolyzate to produce a dry soluble hydrolyzed protein material.

6. The method of breaking down gossypol in gossypol-containing cottonseed meal which comprises contacting press cake or solvent-extracted gossypol-containing cottonseed meal with boiling hydrochloric acid at temperatures below about 150° C. for a time sufficient to breakdown substantially all gossypol in the cottonseed meal and produce a hydrolyzed cottonseed protein material.

7. The method of claim 6 wherein the acid hydrolyzed cottonseed protein material contains less than about 450 ppm free gossypol.

8. The method of breaking down the gossypol in gossypol-containing cottonseed meal to produce a proteinaceous food product suitable for human consumption which comprises boiling the cottonseed meal after screw pressing or solvent extraction of natural oils in an aqueous hydrochloric acid solution at temperatures below about 150° C. for at least three hours.

* * * * *